United States Patent [19]

Chase

[11] Patent Number: 4,589,509

[45] Date of Patent: May 20, 1986

[54] WHEEL PUSHING DEVICE

[76] Inventor: Phil Chase, 2646 Gilbert Way, Rancho Cordova, Calif. 95670

[21] Appl. No.: 665,984

[22] Filed: Oct. 29, 1984

[51] Int. Cl.$^4$ ............................................. B60D 1/00
[52] U.S. Cl. ........................................ 180/74; 74/13; 254/35
[58] Field of Search ................. 180/74; 74/13; 254/35

[56] References Cited

U.S. PATENT DOCUMENTS

| | | | |
|---|---|---|---|
| 3,937,290 | 2/1976 | Benning | 180/74 |
| 4,007,801 | 2/1977 | Vincent et al. | 180/74 |
| 4,125,029 | 11/1978 | Krezak et al. | 180/74 |
| 4,418,784 | 12/1983 | Fox | 180/74 |

Primary Examiner—Richard A. Bertsch
Attorney, Agent, or Firm—Mark C. Jacobs

[57] ABSTRACT

A device for use in pushing a vehicle mounted on wheels in a forwardly direction is disclosed. The device includes a studded driving roller which is adapted to be placed behind and in contact with a wheel on the vehicle to be pushed. A pair of supporting rollers are rotably mounted on the driving roller for supporting the device on the surface on which the vehicle is resting. The supporting rollers are coupled to the driving roller by a first pair of spiral clutches. A yoke is also rotably mounted on the driving roller and is coupled to the driving roller by a second pair of spiral clutches. In use, the yoke is pushed up and down in a pumping action. During each downward stroke of the yoke, the support rollers will turn in a counter-clockwise forwardly moving direction while the driving roller will move in a clockwise direction. The clockwise rotation of the driving roller will produce a counter-clockwise rotation of the wheel causing the vehicle to move in a forwardly direction.

10 Claims, 3 Drawing Figures

WHEEL PUSHING DEVICE

SUMMARY OF THE INVENTION

The present invention relates generally to a wheel pushing device and more particularly to a novel technique for externally applying torque to a wheel of a vehicle for the purpose of pushing the vehicle in a forwardly direction.

It is well known that a vehicle mounted on wheels can be moved in a forwardly direction by simply pushing it from the rear with force sufficient to overcome the coefficient of friction between the wheels of the vehicle and the surface on which the vehicle is resting. In many situations, however, it is difficult, if at all possible, to supply the necessary force by pushing on the vehicle from the rear.

It is an object of this invention to provide a new and novel device for use in pushing a vehicle mounted on wheels in a forwardly direction.

It is another object of this invention to provide a new and novel device for use in applying torque to a wheel for the purpose of moving the vehicle.

SUMMARY OF THE INVENTION

A wheel pushing device for use in pushing a wheel on a vehicle resting on a surface in a forwardly direction so that said vehicle can be moved from one location on said surface to another location constructed according to the teachings of the present invention comprises a driving roller adapted to be placed behind said wheel and be brought into contact with said wheel, a pair of supporting rollers rotably mounted on said driving roller for supporting said driving roller on said surface, a yoke rotably mounted on said driving roller and means operatively coupled to said yoke, said driving roller and said pair of supporting rollers such that rotational movement of said yoke in one direction will cause counter-clockwise rotation of said pair of supporting rollers and clockwise rotation of said driving roller and rotational movement of said yoke in in said other direction will produce no rotational movement of either said supporting rollers or said driving roller in either direction, whereby, rotational movement of said yoke back and forth will cause said vehicle to be pushed in said forward direction.

Various objects and advantage will appear from the description to follow. In the description, reference is made to the accompanying drawing which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made including power sources other than applied manual force without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERRED EMBODIMENT

Figure 1:
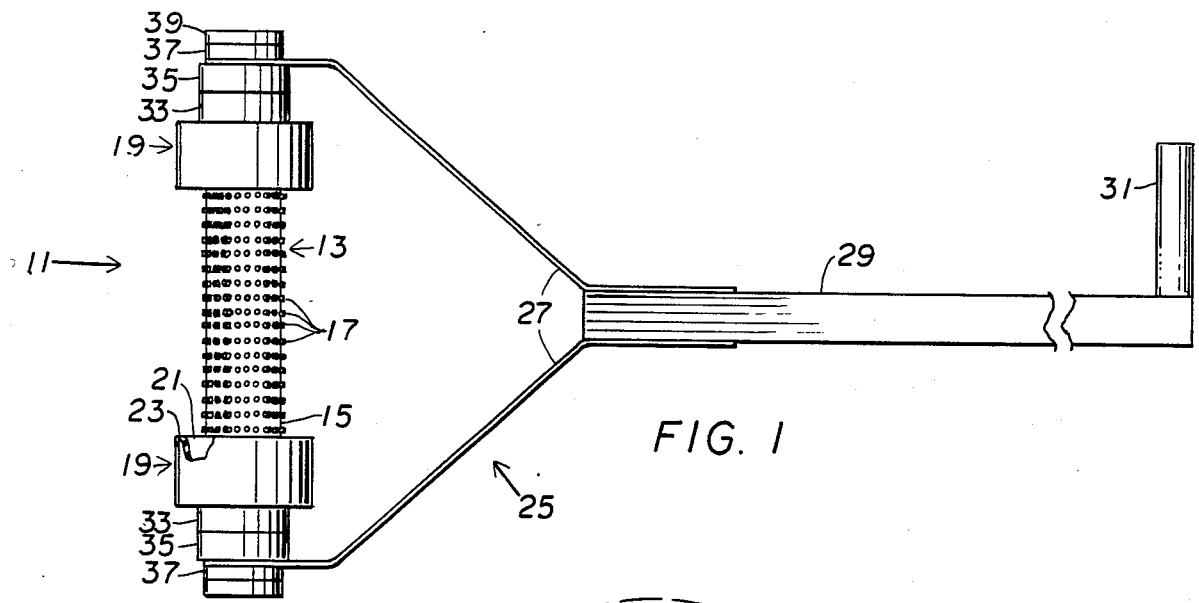
FIG. 1 is a plan view of a wheel pushing device constructed according to the teachings of the present invention.

Referring now to the drawings, there is illustrated in FIG. 1 a perspective view of a wheel pushing device constructed according to the teachings of the present invention and identified by reference numeral 11.

Wheel pushing device 11 includes a driving roller 13 which is adapted to be positioned behind the wheel of a vehicle to be moved. Driving roller 13 includes a length of steel pipe 15. The ends of steel pipe 15 are externally threaded. The middle section of steel pipe 15 is studded with a grid pattern of rollpins 17 which provide traction or gripping action of steel pipe 15 relative to the tire on which the wheel is mounted.

A pair of support rollers 19 are rotably mounted on driving roller 13 and serve to support driving roller 13 on the surface on which the vehicle is resting. Support rollers 19 may comprise lengths of hollow nylon tubing 21. A length of neoprene hose 23 may be attached to the outside surface of nylon rod 21 to provide increased traction with the surface on which the vehicle is resting.

Wheel pushing device 11 further includes a yoke 25 which is rotably mounted on driving roller 13. Yoke 25 includes a pair of legs 27, a base 29 and an offset handle 31.

Wheel pushing device still further includes a first pair of spiral clutches 33 and a second pair of spiral clutches 35. As is known, a spiral clutch is a device which is made up primarily of a coil of wire and which will transmit torque in one direction and will slip in the other direction. Clutches 33 are coupled between driving roller 13 and support rollers 19 and are arranged to allow rotation of support rollers 19 in a counter-clockwise direction when driving roller 13 is rotated in a clockwise direction but prevents rotation in a counter-clockwise direction of driving roller 13 when yoke 25 is rotated upward. Clutches 35 are coupled between yoke 25 and driving roller 13 and are arranged to cause driving roller 13 to rotate in a clockwise direction when yoke 25 is rotated downward in a clockwise direction and slip when yoke 25 is rotated upward in a counter-clockwise direction.

Finally, wheel pushing device 11 includes a pair of spacing collars 37 and a pair of retaining nuts 39.

Figure 2:
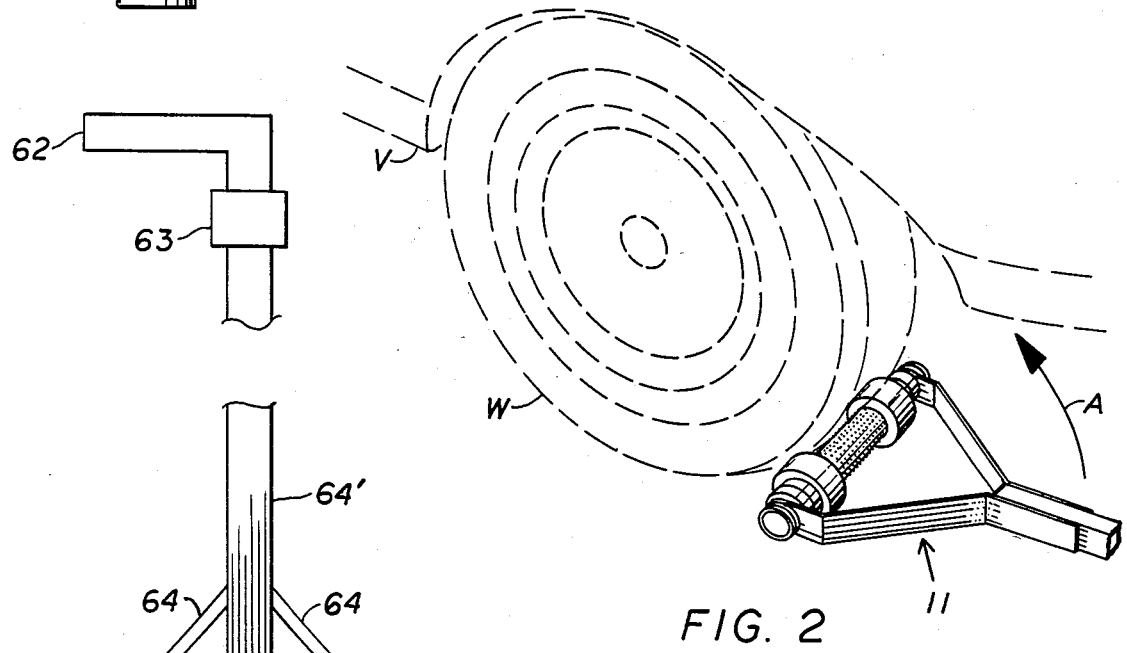
FIG. 2 is a perspective view illustrating how the device of FIG. 1 is positioned behind a wheel of a vehicle to be pushed.

In use, device 11 is positioned directly behind the wheel W to be pushed, as shown in FIG. 2. Movement is achieved by pivotally moving yoke 25 up and down in a pumping type of motion. When yoke 25 is rotated in a counter-clockwise direction as shown by arrow A no torque or rotational movement is applied to driving roller 13. Consequently, no rotational movement will be imparted to support rollers 19. On the other hand, when yoke 25 is pushed downward in a clockwise direction, the downward movement will produce a clockwise movement of driving roller 13 and a counter-clockwise rotation of support rollers 19. The counter-clockwise rotation of support rollers 19 will move device 11 in a forwardly direction. At the same time, the clockwise rotation of driving roller 13 as it is contact with wheel W, FIG. 2 will produce a counter-clockwise rotation of wheel W causing the vehicle to move or be pushed forwardly. Thus, each time yoke 25 is pumped or pushed downwardly in a clockwise direction the vehicle V will be pushed forwardly.

As can be appreciated, the invention may be used for moving any wheel mounted vehicle, such as an automobile or even an airplane, in a forwardly direction.

As can also be appreciated, the wheels on the vehicle to be pushed must be freely movably, i.e. not locked in place.

Handle 31 may be fixedly secured to the end of said yoke 25 by any suitable means known in the art.

The term rotably as used herein is synonomous with rotatably.

In the discussion below, like numbers refer to like parts.

In FIGS. 1 and 2 there is shown a manually operated version of my device. It is also to be seen that the source of input power to the driving roller can be a motor as seen with reference to FIG. 3. Motor 60 turns driving roller 11 by chain or belt 61 when placed behind driven wheel not shown using L-shaped, tubular operator's handle 62 and on/off switch 63 mounted on 62 and electrically connected to motor 60 which in turn can be A/C powered per cord 65 or gas fed, not shown.

The anti-reverse function which was the spiral clutch 33 and 35 arrangement shown in FIG. 1 is herein performed by gear train friction or a clutch within the motor 60, as is readily understandable by skilled artisians operating in this field.

Figure 3:
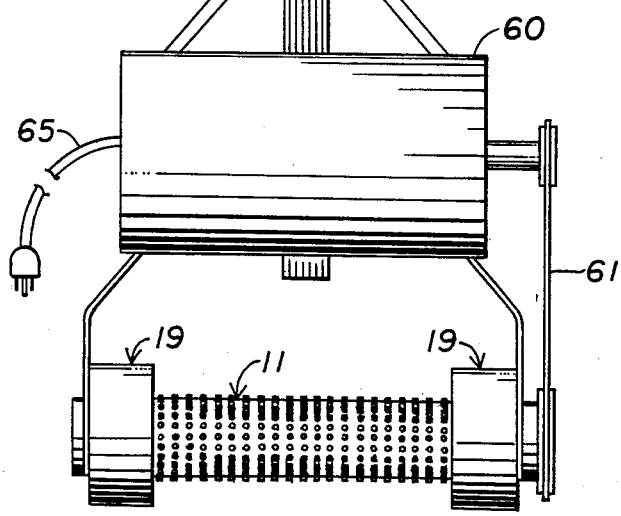
FIG. 3 is a front elevational graphic depiction of a second embodiment of this invention.

Obviously all of these components may be housed in a suitable housing not shown. This view of a motorized device 11 is but a typical configuration. Others also within the skill of the artisian in this field can be devised. Thus the motor could be gasoline or electric or hydraulic or pneumatic or other power as well. Reference is also made to FIG. 3 which also depicts a pair of opposed optional braces 64 for main brace 64' as well.

The embodiment of the present invention is intended to be merely exemplary and those skilled in the art shall be able to make numerous variations and modifications to it including power sources other than applied manual force without departing from the spirit of the present invention. All such variations and modifiations are intended to be within the scope of the present invention as defined in the appended claims.

What is claimed is:

1. A wheel pushing device for use in pushing a wheel on a vehicle which vehicle is resting on a surface, in a forward direction so that said vehicle can be moved from one location on said surface to another location, said wheel pushing device comprising:
   a. a driving roller adapted to be placed behind said wheel and be brought into contact with said wheel,
   b. a pair of supporting rollers rotably mounted on said driving roller for supporting said driving roller on said surface,
   c. a yoke rotably mounted on said driving roller, and
   d. spiral clutch means operatively coupled to said yoke, and to said driving roller; and spiral clutch means operatively coupled from said driving roller to said pair of supporting rollers such that rotational movement of said yoke in a first vertical direction will cause counter-clockwise rotation of said pair of supporting rollers and clockwise rotation of said driving roller;
   and rotational movement of said yoke in the opposite vertical direction will produce no rotational movement of either of said supporting rollers or said driving roller in either direction,
   whereby, rotational movement of said yoke up and down will cause said vehicle to be pushed in said forward direction.

2. The wheel pushing device of claim 1 and wherein said means operatively coupled to said yoke, said driving roller and said pair of supporting rollers includes:
   a. a first pair of clutches for coupling said supporting rollers to said driving roller, and
   b. a second pair of clutches for coupling said yoke to said driving roller.

3. The wheel pushing device of claim 2 and wherein said first pair of clutches and said second pair of clutches are both spiral clutches.

4. The wheel pushing device of claim 3 and wherein said first pair of clutches is mounted to prevent rotational movement of said pair of supporting rollers in one direction relative to said driving roller and said second pair of clutches is mounted to produce rotational movement of said driving roller in the opposite direction.

5. The wheel pushing device of claim 4 and wherein said driving roller includes a plurality of tire engaging elements for gripping the tire on the wheel of the vehicle to be moved.

6. The wheel pushing device of claim 5 and wherein said spiral clutches are deposed between said yoke and said supporting rollers.

7. The wheel pushing device of claim 6 and further including a retaining nut on each end of said driving roller and a spacing collar disposed between each retaining nut and said yoke.

8. The wheel pushing device of claim 7 and wherein said yoke includes a pair of legs and a base.

9. The wheel pushing device of claim 8 and further including a handle mounted on said base in offset relationship.

10. In the device of claim 1 wherein the first vertical direction is downward, and the second vertical direction is upward.

* * * * *